United States Patent
Ng et al.

(10) Patent No.: US 9,929,451 B2
(45) Date of Patent: Mar. 27, 2018

(54) BATTERY ASSEMBLY

(71) Applicant: Ampd Energy Limited, Hong Kong (CN)

(72) Inventors: Brandon Boon Soon Ng, Hong Kong (CN); Luciano Gurgel Valente, Hong Kong (CN); Clayton Ip, Hong Kong (CN); Kevin Chan, Hong Kong (CN); Ya Lv, Hong Kong (CN)

(73) Assignee: Ampd Energy Limited, Hong Kong (CN)

( * ) Notice: Subject to any disclaimer, the term of this patent is extended or adjusted under 35 U.S.C. 154(b) by 0 days.

(21) Appl. No.: 15/269,988

(22) Filed: Sep. 20, 2016

(65) Prior Publication Data
US 2017/0012331 A1 Jan. 12, 2017

Related U.S. Application Data

(63) Continuation-in-part of application No. 15/117,732, filed as application No. PCT/CN2015/092426 on Oct. 21, 2015.
(Continued)

(51) Int. Cl.
| | |
|---|---|
| *H05K 7/00* | (2006.01) |
| *H01M 10/667* | (2014.01) |
| *H01M 2/10* | (2006.01) |
| *H01M 2/20* | (2006.01) |
| *H01M 10/653* | (2014.01) |

(Continued)

(52) U.S. Cl.
CPC ......... *H01M 10/667* (2015.04); *H01M 2/022* (2013.01); *H01M 2/105* (2013.01); *H01M 2/1055* (2013.01); *H01M 2/204* (2013.01); *H01M 2/34* (2013.01); *H01M 10/02* (2013.01); *H01M 10/0422* (2013.01); *H01M 10/653* (2015.04); *H01M 2200/103* (2013.01); *H01M 2220/30* (2013.01)

(58) Field of Classification Search
CPC .. H01M 10/667; H01M 10/653; H01M 10/02; H01M 10/0422; H01M 2/022; H01M 2/105; H01M 2/1055; H01M 2200/103
USPC .................................................. 361/728–730
See application file for complete search history.

(56) References Cited

U.S. PATENT DOCUMENTS

| | | | |
|---|---|---|---|
| 4,411,970 A | 10/1983 | Meyer et al. | |
| 5,146,150 A | 9/1992 | Gyenes et al. | |
| 7,824,796 B1 * | 11/2010 | Bode | H01M 2/105 |
| | | | 429/100 |

(Continued)

FOREIGN PATENT DOCUMENTS

| | | | | |
|---|---|---|---|---|
| JP | 2010198990 | * | 9/2010 | ............ H01M 2/10 |
| WO | 2008050953 A1 | | 5/2008 | |

OTHER PUBLICATIONS

B Wu et al, "Fault Analysis in Bettery Module Design for Electric and Hybrid Vehicles", 6th IET International Conference on Power Electronics, Machines and Drives, Mar. 29, 2012.
(Continued)

*Primary Examiner* — Hung S Bui
(74) *Attorney, Agent, or Firm* — Eagle IP Limited; Jacqueline C. Lui

(57) ABSTRACT

A battery assembly that includes a plurality of batteries. The battery assembly includes a printed circuit board integrated with plural fuses and resistors. The sizes of the resistors vary based on a distance between the batteries and a connection point to compensate for resistance differences from each battery to the connection point.

19 Claims, 13 Drawing Sheets

Related U.S. Application Data

(60) Provisional application No. 62/067,450, filed on Oct. 23, 2014, provisional application No. 62/272,699, filed on Dec. 30, 2015.

(51) Int. Cl.
  *H01M 2/02* (2006.01)
  *H01M 10/02* (2006.01)
  *H01M 10/04* (2006.01)
  *H01M 2/34* (2006.01)

(56) References Cited

U.S. PATENT DOCUMENTS

| | | |
|---|---|---|
| 9,176,197 B2 | 11/2015 | Chandler et al. |
| 2011/0250487 A1 | 10/2011 | Nakashima et al. |
| 2013/0202941 A1* | 8/2013 | Ono ............... H01H 69/02 429/121 |
| 2014/0356671 A1* | 12/2014 | Dawley ............ H01M 2/206 429/90 |
| 2015/0325893 A1* | 11/2015 | Burrows ........... H01M 10/657 429/120 |
| 2016/0006007 A1* | 1/2016 | Takasaki .......... H01M 2/0277 429/99 |

OTHER PUBLICATIONS

Gregory J. Offer et al, "Module Design and Fault Diagnosis in Electric Vehicle Batteries", Journal of Power Sources, vol. 206, Jan. 21, 2012, pp. 383-392.

\* cited by examiner

BATTERY ASSEMBLY

FIELD OF THE INVENTION

The present invention relates to a battery assembly that includes a plurality of batteries positioned between two printed circuit boards with fuses.

BACKGROUND

Electronic devices often require power from a portable power supply. These power supplies can include rechargeable lithium-ion batteries that are arranged in an assembly or pack. The batteries are arranged in series or in parallel to obtain a desired capacity or voltage.

In view of the demand for portable power, improvements in battery assemblies and power components are desired.

SUMMARY OF THE INVENTION

Figure 1A:
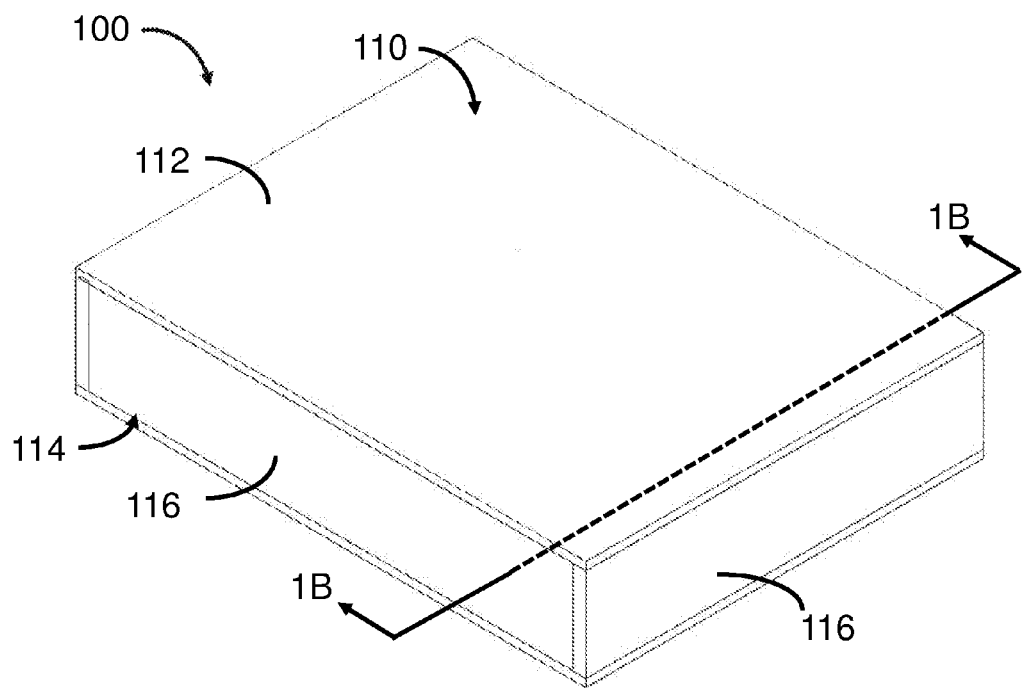
FIG. 1A shows a battery assembly in accordance with an example embodiment.

One example embodiment is a battery assembly that includes a plurality of batteries. The battery assembly includes a printed circuit board integrated with plural fuses and resistors. The sizes of the resistors vary based on a distance between the batteries and a connection point to compensate for resistance differences from each battery to the connection point.

Other example embodiments are discussed herein.

DETAILED DESCRIPTION

Example embodiments relate to apparatus and methods that provide a rechargeable power supply that includes one or more rechargeable batteries. The batteries are housed in a module or an assembly that is portable.

An example embodiment includes a battery assembly with a plurality of batteries that are individually fused and interconnected through a conductive structure. The conductive structure includes deformable and spring-supported flat conductive sheets that electrically connect batteries in parallel and/or series.

In one embodiment for example, the batteries are housed or sandwiched between two printed circuit boards (PCBs) that electrically connect to the conductive sheets. Elastomeric pads, cushions, or springs are located between a PCB and a respective terminal or end of a battery. The pads push against or bias the conductive sheets such that the fuses bend or deform and position the conductive contacts out of a planar view of the conductive sheets. In this position, the conductive contacts abut or engage the terminals of the batteries and provide support to the assembly and electrical contact between the batteries and PCBs.

In an example embodiment, the conductive sheets are fabricated from one or more sheets of conductive material in which material is removed from the sheets to provide a shape and size of conductors and fuses for the batteries. For instance, material is removed, etched, or stamped out from a sheet to generate a plurality of conductive contacts. Alternatively, the conductive sheets are made without needed material, such as fabricating the conductive sheet with holes or spaces at the fuse cells (e.g., holes or spaces adjacent to the conductive contacts of a fuse cell).

Each conductive contact has two legs formed as thin wires. These legs are dimensioned to allow for an expected current to pass through them without significant heat being generated during normal operation of the battery assembly. In the event of an overcurrent situation, the wires burn, melt, or break and electrically disconnect.

The wires of a fuse are dimensioned to be economically producible with sufficient strength to not break during normal or expected usage of the battery assembly. Further, the wires can be curved, such as having an S-shape or other curved configuration, to provide a compact design that meets the fusing requirements of the battery assembly and/or individual batteries.

In an example embodiment, the conductive contacts and fuses are integrally formed in a sheet of material with a linear shape or matrix shape, such as being formed in a sheet having a single row or formed in a sheet having a plurality of rows and columns of conductive contacts and fuses. For example, the fuses are formed into or from the sheet when the sheet is processed (such as the fuses or fuse cells being formed when the sheet is stamped, etched, processed to remove material, or processed to form the fuse cells and/or fuses). Alternatively, the fuses and/or fuse cells are not integrally formed in the sheet (such as being formed as one or more separate units and then attached to the sheet).

FIG. 1A shows a battery pack or battery assembly 100 enclosed in a housing 110 with a rectangular shape. The housing 110 includes a top cover or lid 112, a bottom cover or lid 114, and a plurality of side covers 116 that house, enclose, and/or protect components of the battery assembly. The housing provides the battery assembly with a form factor such that two or more assemblies can be stacked, electrically connected, and transported together.

Figure 1B:
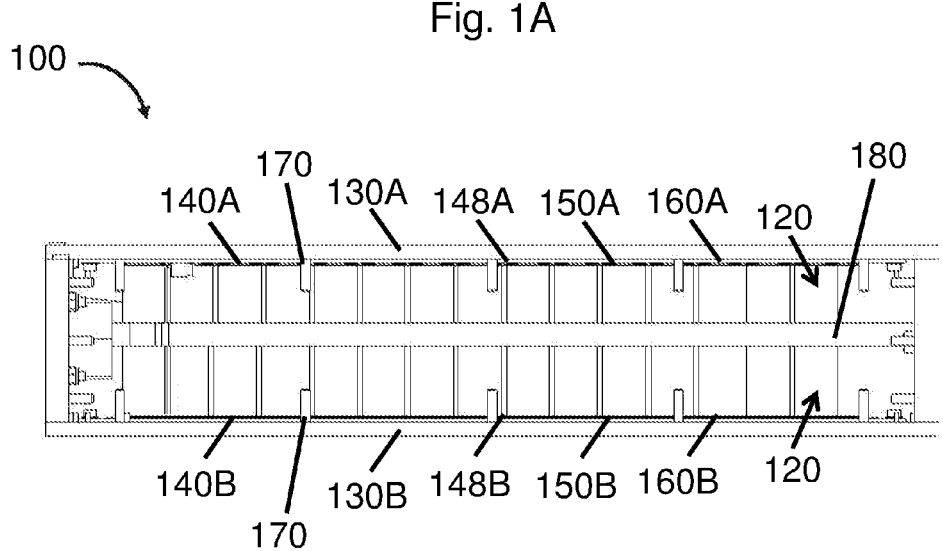
FIG. 1B shows a cut-away view of the battery assembly of FIG. 1A in accordance with an example embodiment.

FIG. 1B shows the battery assembly 100 with the side covers removed. The battery assembly 100 includes a plurality of batteries 120 positioned or sandwiched between a top cover or lid 130A and a bottom cover or base 130B. Each battery has a first end or terminal 140A and a second end or terminal 140B. The first end 140A electrically contacts or abuts a top or first conductive sheet 150A, and the second end 140B electrically contacts or abuts a bottom or second conductive sheet 150B (an example conductive sheet more fully shown in FIG. 2). As discussed and shown in more detail herein, a top or first PCB 148A is sandwiched between the top cover 130A and the top conductive sheet 150A. A bottom or second PCB 148B is sandwiched between the bottom cover 130B and the bottom conductive sheet 150B. A plurality of top or first elastomeric pads or cushions 160A force or bias the first conductive sheet 150A against the first end 140A, and a plurality of bottom or second elastomeric pads or cushions 160B force or bias the second conductive sheet 150B against the second end 140B (this configuration more fully shown in FIG. 6).

As shown in FIG. 1B, the top cover 130A and bottom cover 130B include a plurality of posts or dowels or pins 170 that extend outwardly from the covers to position and align the PCBs and the conductive sheets to terminals of the batteries.

Figure 5:
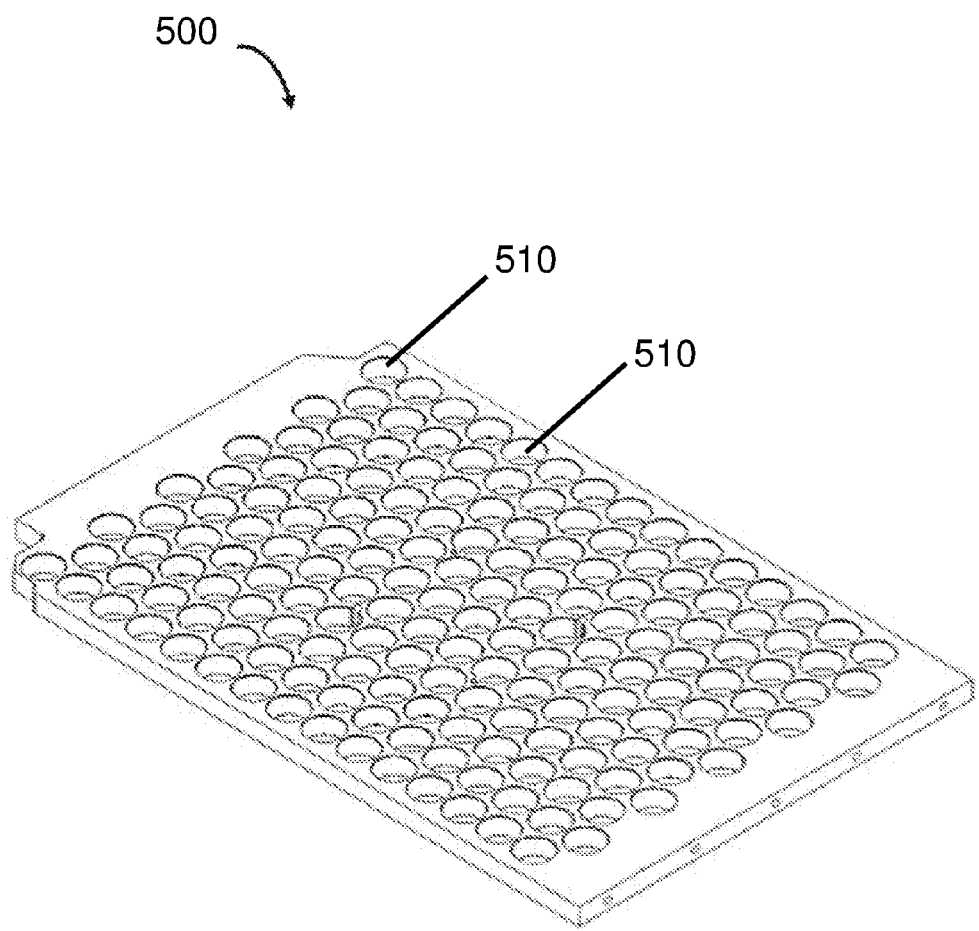
FIG. 5 shows a support structure of a battery assembly in accordance with an example embodiment.

The battery assembly also includes a support structure 180 that supports and aligns the batteries 120 in the battery assembly (the support structure more fully shown in FIG. 5).

As shown in FIG. 1B and with reference to FIG. 1A, the batteries are stacked, positioned, or arranged in a side-by-side relationship and arranged in a matrix-shape or grid-structure such that each of the batteries is in electrical contact with a fuse of a first conductive sheet at a first terminal end and with another fuse of a second conductive sheet at a second terminal end. In this configuration, the batteries can be connected in series, parallel, or a combination of both and can be individually fused via the conductive sheets.

Figure 2:
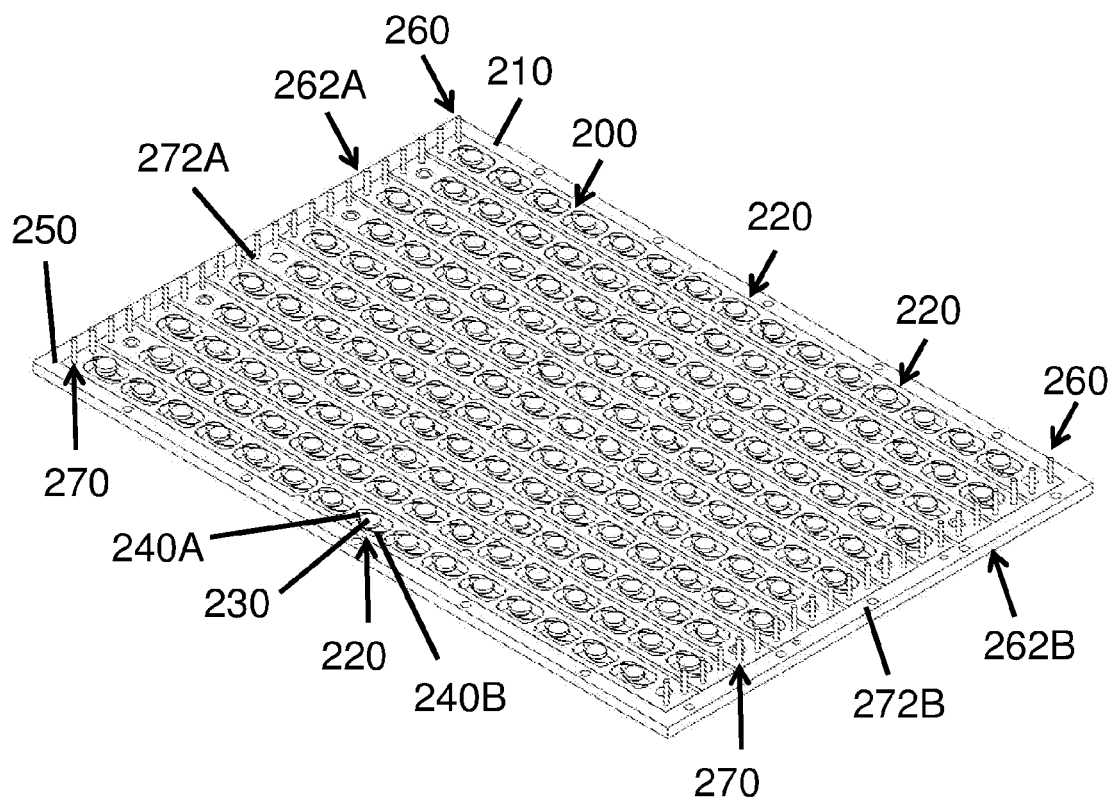
FIG. 2 shows a flat conductive sheet connected to a jig in accordance with an example embodiment.

FIG. 2 shows a flat conductive sheet 200 connected to a jig or fixture 210 in accordance with an example embodiment. The conductive sheet 200 includes a plurality of fuse cells or fuses 220 arranged in grid or matrix shape. For illustration, the conductive sheet 200 includes an array of fuse cells arranged in an eleven by fifteen (11×15) matrix such that the array has eleven (11) columns and fifteen (15) rows.

The fuse cells can be arranged in different patterns or geometries. As one example, the fuse cells are arranged in an N×M matrix wherein N and M are integers greater than or equal to one (1). As another example, the fuse cells are arranged in a linear array, such as arranging a plurality of fuse cells side-by-side along a straight or curved path.

Each fuse cell 220 includes a conductive contact 230 and two legs or wires 240A and 240B that connect to and extend outwardly from the conductive contact. In an example embodiment, the legs 240A and 240B are oppositely disposed from each other and have a straight and/or curved configuration.

As shown in FIG. 2, the jig 210 includes a flat surface 250 with a plurality of posts, dowels, or pins 260 arranged along two oppositely disposed ends 262A and 262B of the jig 210. The conductive sheet includes a plurality of holes 270 arranged along two oppositely disposed ends 272A and 272B. The posts 260 align with and extend through the holes 270 so that the flat surface 250 of the jig 210 seats against, abuts, or is proximate to a flat surface of the conductive sheet 200.

Figure 3:
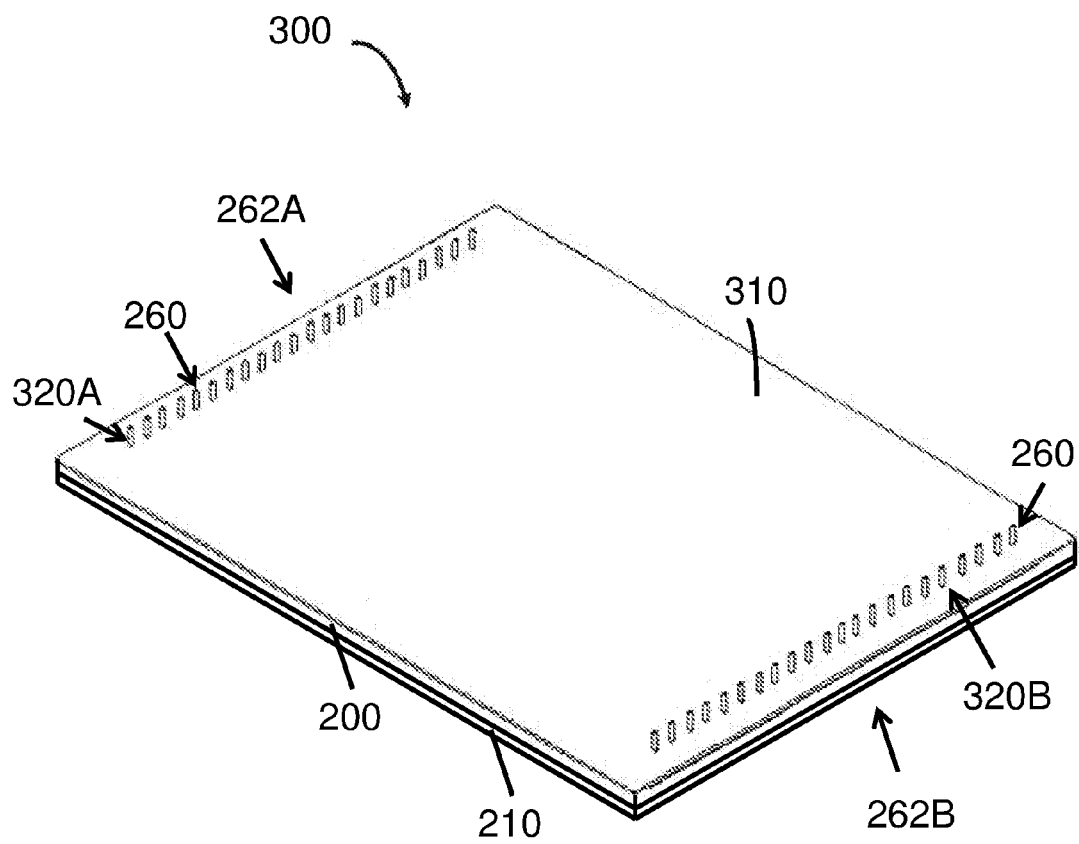
FIG. 3 shows a printed circuit board assembly of a battery assembly in accordance with an example embodiment.

FIG. 3 shows a PCB assembly 300 that is formed by placing a PCB 310 on top of or over the jig 210 and conductive sheet 200 shown in FIG. 2. As shown in FIG. 3, the PCB assembly 300 includes the PCB 310 positioned over the conductive sheet 200 such that the conductive sheet is sandwiched between the PCB 310 and the jig 210. The PCB 310 includes a plurality of holes 320A along one end and a plurality of holes 320B along an opposite end. These holes align with the pins 260 of the jig 210. In this configuration, the PCB 310 and the conductive sheet 200 are permanently connected together, such as with a series of solder points. Once the PCB and conductive sheet are connected, the jig 210 is removed.

Figure 4:
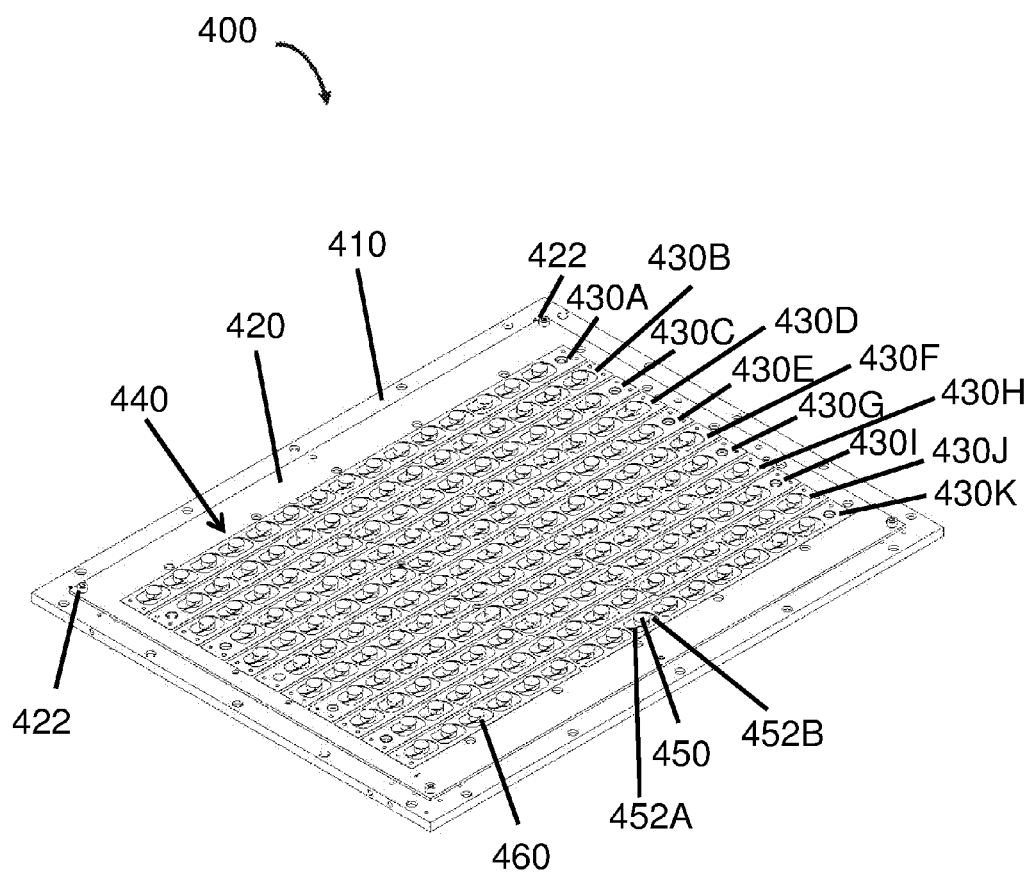
FIG. 4 shows a cover assembly of a battery assembly in accordance with an example embodiment.

FIG. 4 shows a cover assembly 400 of a battery assembly in accordance with an example embodiment. The cover assembly 400 includes a lid or cover 410 connected to a PCB 420 through fasteners 422 located in corners of the cover and PCB. A plurality of conductive sheets 430A-430K are permanently connected to the PCB 420. For illustration, each conductive sheet 430A-430K includes fifteen (15) fuse cells 440 with each fuse cell having a conductive contact 450 and fuse legs or wires 452A and 452B.

An elastomeric pad or cushion 460 is positioned behind each fuse cell such that the cushion is sandwiched between the PCB 420 and a fuse cell. The cushions 460 have a round or circular shape in a plan view and a cylindrical shape in a perspective view. The cushions can have other shapes as well, such as square, rectangular, polygonal, etc.

In an example embodiment, each cushion has a size and shape that emulate a size and shape of a conductive contact of a fuse cell. FIG. 4, for example, shows that the cushions 460 have a cylindrical shape, and the conductive contacts 450 have a round or circular shape. The cushions 460 are positioned against or adjacent the PCB 420 and bias, push, or force the conductive contacts 450 outwardly or away from the PCB 420.

FIG. 5 shows a support structure 500 of a battery assembly in accordance with an example embodiment. The support structure 500 includes a plurality of spaced holes 510 arranged in a grid, lattice, or matrix shape. The holes are sized and shaped to receive the batteries of the battery assembly. For example, a diameter of a hole corresponds with or is slightly larger than a diameter of a battery that fits into or through a hole. For instance, a lattice of holes are spaced apart such that each hole encircles a mid-section of a battery such that the support structure maintains the batteries in stable vertical orientation with respect to each other (for example, see FIG. 1B showing the batteries arranged in a vertical orientation).

Figure 6:
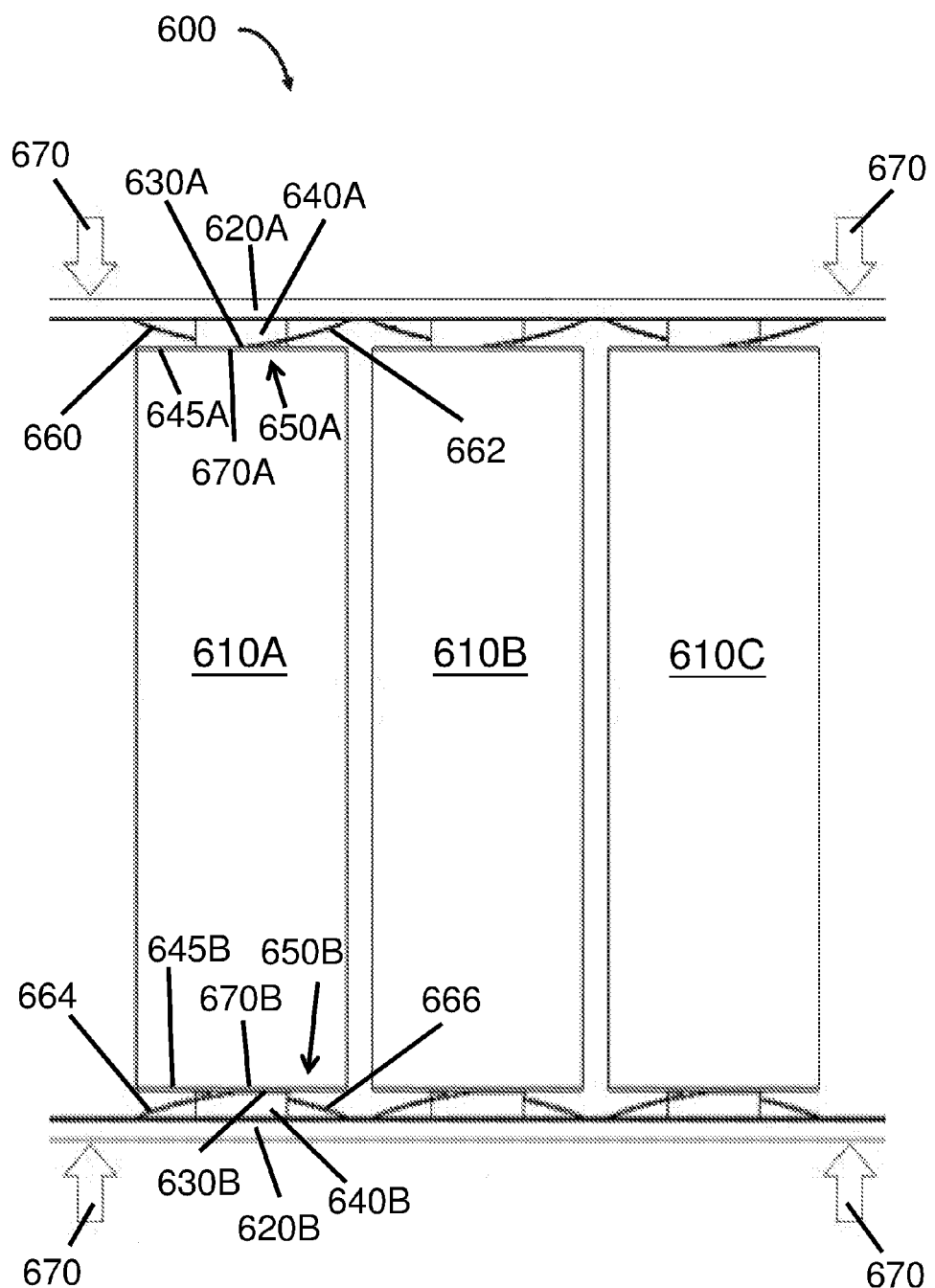
FIG. 6 shows a partial view of a battery assembly in which a plurality of batteries are positioned between two printed circuit boards, two conductive sheets, and two elastomeric pads in accordance with an example embodiment.

FIG. 6 shows a partial view of a battery assembly 600 in which a plurality of batteries 610A-610C are positioned between two printed circuit boards 620A and 620B, two conductive sheets 630A and 630B, and two elastomeric pads or cushions 640A and 640B in accordance with an example embodiment (the pads being labeled for battery 610A).

As shown for battery 610A, pad 640A is seated between the PCB 620A and the conductive sheet 630A. In this configuration, the pads biases, pushes, or forces the conductive sheet into electrical contact with an end or terminal 645A of battery 610A. For example, pad 640A engages fuse cell 650A, deforms or bends wires or legs 660 and 662 such that conductive contact 670A moves out of plane as seen from a side-view to abut or to engage the end or terminal 645A of the battery 610A.

As shown for battery 610A, pad 640B is seated between the PCB 620B and the conductive sheet 630B. In this configuration, the pad biases, pushes, or forces the conductive sheet into electrical contact with an end or terminal 645B of battery 610B. For example, pad 640B engages fuse cell 650B, deforms or bends wires or legs 664 and 666 such that conductive contact 670B moves out of plane to abut or to engage the end or terminal 645B of the battery 610A.

Arrows 670 show a force being applied to PCB 620A and PCB 620B from a housing or enclosure (e.g., see FIG. 1). In this configuration, the batteries 610A-610C are lodged or supported inside of the battery assembly.

An elastomeric pad, cushion, or spring can be made from a variety of materials including, but not limited to, compressible silicone foam, non-conductive spring (such as a plastic spring or a spring made from non-conductive metal), rubber, or a polymer (such as a polyurethane elastomeric alloy).

Figure 7A:
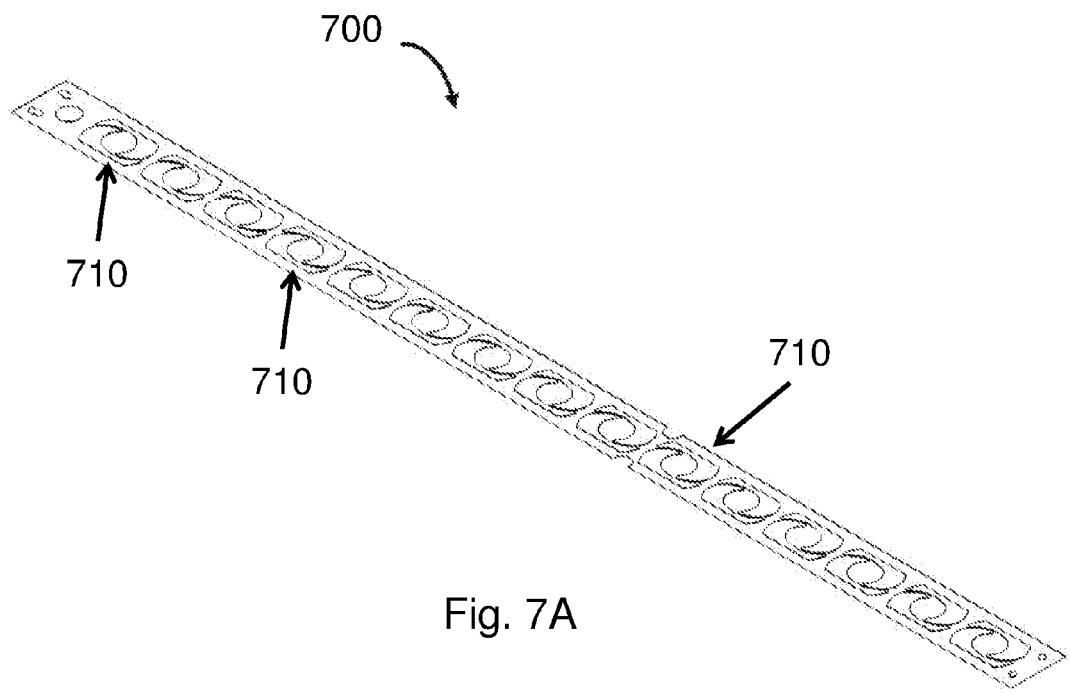
FIG. 7A shows a conductive sheet formed as a linear strip of fuse cells with integrated fuses in accordance with an example embodiment.
Figure 7B:
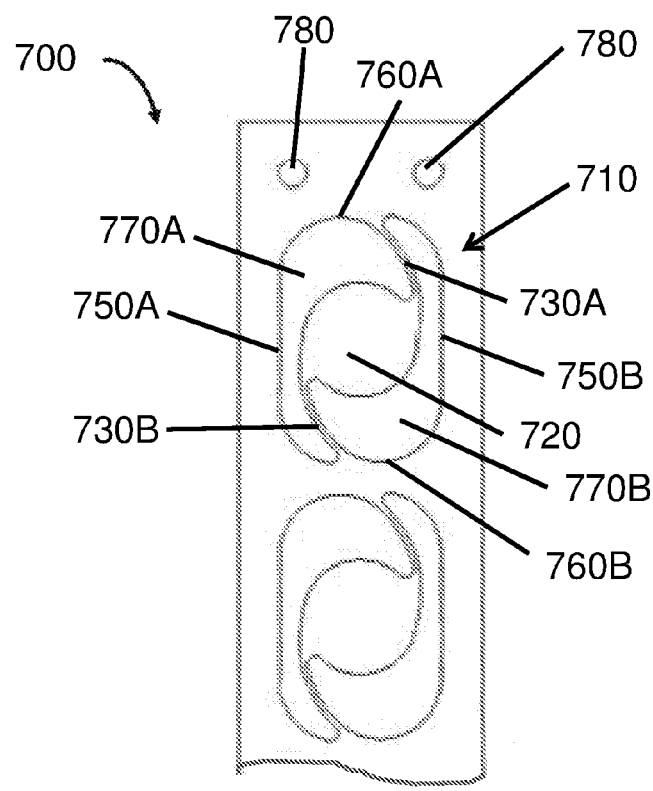
FIG. 7B shows a portion of the conductive sheet with integrated fuses of FIG. 7A in accordance with an example embodiment.

FIG. 7A shows a conductive sheet 700 formed as linear strip of fuse cells 710 with integrated fuses in accordance with an example embodiment. FIG. 7B shows a portion of the conductive sheet 700 with integrated fuses of FIG. 7A in accordance with an example embodiment.

As shown in FIGS. 7A and 7B, each fuse cell 710 includes a conductive contact 720 and two legs or wires 730A and 730B. A conductive portion of the fuse cell has an S-shape with leg 730A being a top curved leg and leg 730B being a bottom curved leg. These legs extend outwardly from opposite ends of a body of the conductive contact 720.

As best shown in FIG. 7B, each fuse cell 710 has a general oval or rectangular shape with two straight sides 750A and 750B and two round or curved ends 760A and 760B. Material from the conductive sheet 700 is removed at locations 770A and 770B to integrally form the fuse cell into the conductive sheet. Ends of the conductive sheet are provided with holes 780 that enable the conductive sheet to be attached to the PCB or another object in the battery assembly.

The fuse cells and elastomeric cushions or pads can have different shapes and sizes. For example, the conductive contact and elastomeric cushions or pads can have a round or circular shape, a rectangular shape, a square shape, a polygonal shape, or another shape with rounded or curved ends or sides.

Each fuse cells acts as a fuse for an individual battery. A combined current carrying capacity of the integrated fuses is higher than an expected current from a single battery. When the current from a battery exceeds the current carrying capacity of the integrated fuses, the integrated fuses for that battery will break or blow and electrically disconnect or isolate the battery from the conductive sheet.

It will be appreciated that numerous methods can be used to alter a current carrying capacity of the fuses (such current carrying capacity being a function of resistance and a rate of heat dissipation). For example, a short fuse with a large cross-sectional area will be able to carry a larger electrical current than a long fuse with a small cross-sectional area.

Figure 8:
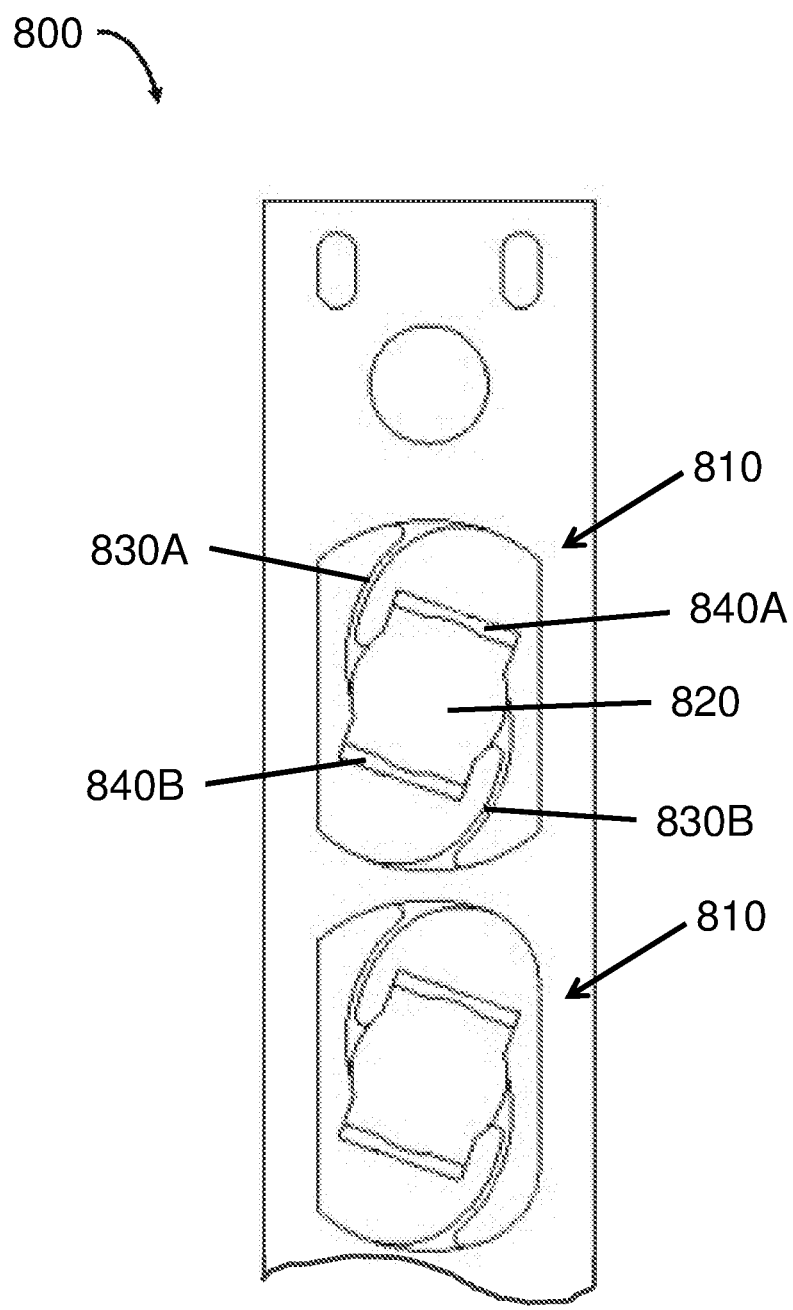
FIG. 8 shows another embodiment of a conductive sheet with a linear strip of fuse cells with integrated fuses in accordance with an example embodiment.

FIG. 8 shows another embodiment of a conductive sheet 800 with a linear array of fuses or fuse cells 810 with a plurality of integrated fuses attached together in accordance with an example embodiment. Each fuse cell 810 includes a conductive contact 820 and two legs or wires 830A and 830B. A conductive portion of the fuse cell has curved-shape or an S-shape with leg 830A being a top curved leg and leg 830B being a bottom curved leg. These legs extend outwardly from opposite ends of a body of the conductive contact 820.

The conductive contact 820 includes two oppositely disposed ends 840A and 840B that include thermal conductive structures. These thermal conductive structures remain electrically isolated from electrical conduction pathways on the PCB while current flows through the fuse cell. The thermal conductive structures cool the fuse cell as heat is dissipated away from the fuse cell. For example, the conductive contact 820 provides a structure or mechanism that transfers heat generated by the battery to the conductive sheet and ultimately to the PCB or another heat sink.

By way of example, the thermal conductive structures attach or engage a PCB. Heat generated from the batteries passes to the conductive contacts, along the thermal conductive structures, and to the PCB. In this manner, the PCB functions as a heat sink for the batteries. Heat is thus dissipated away from the batteries and conductive sheets to the PCBs.

In one example embodiment, the thermal conductive structures are formed as bends, curves, or angled pieces of ends of the conductive contacts. For instance, oppositely disposed ends of the conductive contact 820 bend or taper downwardly or out-of-plane with the conductive contact. These ends (shown as the thermal conductive structures 840A and 840B) engage or contact the PCB when the conductive sheets are soldered to the PCB.

Figure 9:
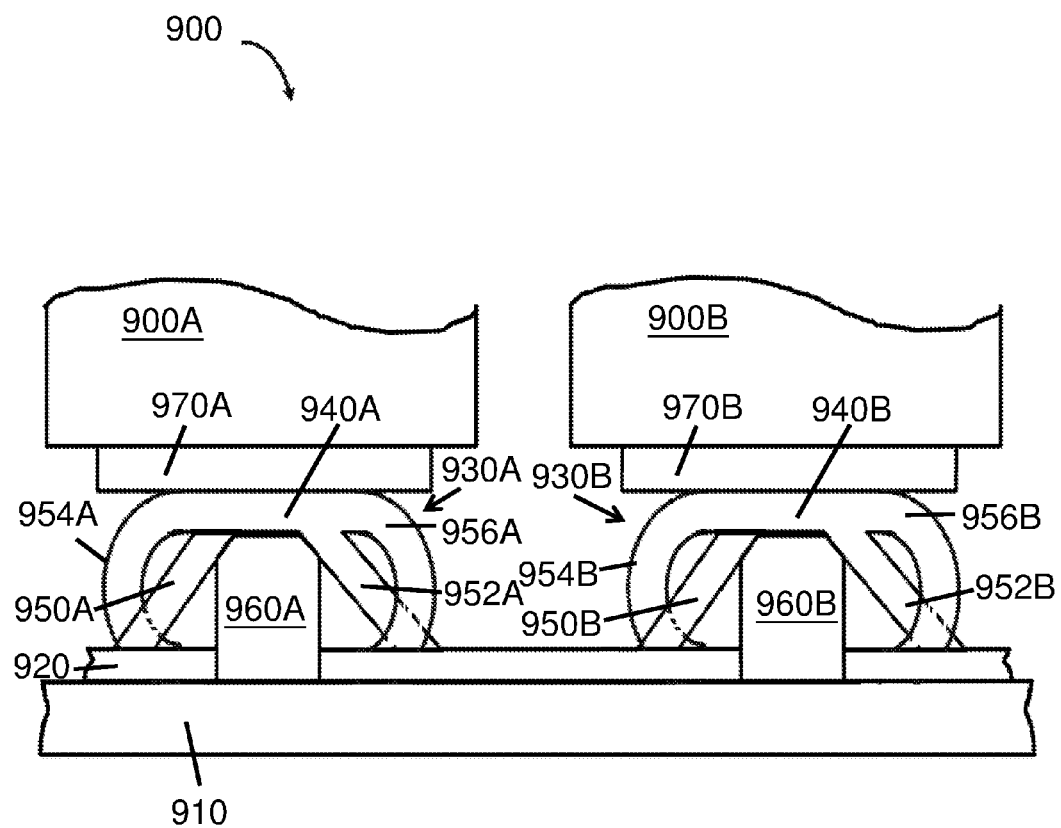
FIG. 9 shows two batteries connected to a printed circuit board in accordance with an example embodiment.

FIG. 9 shows two batteries 900A and 900B connected to a printed circuit board 910 in accordance with an example embodiment. The printed circuit board 910 electrically connects to a conductive sheet 920 that includes two fuses or fuse cells 930A and 930B with a configuration shown in FIG. 8.

Each fuse cells 930A and 930B shown in FIG. 9 includes a conductive contact (shown as 940A and 940B) and two legs (shown as 950A, 952A, 950B, and 952B). Ends of the conductive contacts include a thermal conductive structure (shown as 954A, 956A, 954B, and 956B). An elastomeric pad or cushion 960A is positioned between the conductive contact 940A and the PCB 910, and elastomeric pad or cushion 960B is positioned between the conductive contact 940B and the PCB 910. These elastomeric pads compress and push against the conductive contacts and deform a shape of the fuse cell. A force against the fuse cell causes the conductive contact to move out of plane with the conductive sheet. FIG. 9 shows conductive contacts 940A and 940B pushed above the conductive sheet 920 (FIG. 9 showing an exaggerated view for illustration).

When the conductive contacts 940A and 940B are moved out of plane with respect to a body of the conductive sheet, they engage an electrical contact or terminal (shown as 970A and 970B) for batteries 900A and 900B. In this configuration, the elastomeric pads compress and assist in supporting the batteries in the battery assembly and providing electrical contact between the batteries and the conductive sheet and/or PCB.

Example embodiments include battery assemblies that provide a rechargeable power supply that includes one or more rechargeable batteries. The batteries are housed in a module or an assembly that is portable.

An example embodiment includes a battery assembly with a plurality of batteries that are individually fused and interconnected through a printed circuit board (PCB). The fuses are integrated in the PCB and electrically connect batteries in parallel and/or in series. In the event of an overcurrent situation, the fuses burn, melt, or break and electrically disconnect.

In one embodiment for example, the batteries are housed or sandwiched between two printed circuit boards (PCBs) with integrated fuses. Springs on the PCBs contact the battery ends. Each of the batteries are individually fused and connected with each other in parallel or in series. Compensation resistors or traces electrically connect the batteries to a bus line and to a power collector. Current from the batteries flows along the bus line and is collected by the power collector. The sizes of the compensation traces that are connected with the bus line vary based on a distance between each of the battery terminals and a connection point that is at the intersection of the bus line and the power collector. By varying the sizes of the compensation traces, the resistance of the compensation traces varies to compensate for the different path resistances along the bus line from the end of each compensation trace that joins the bus line to the power collector, and hence the variations of current drawn from each of the batteries to the corresponding connection point are minimized. In one example, the variation of current is less than 12%.

In one example embodiment, voltages of each row of batteries that are connected to each other in parallel are measured by a voltage detector. The voltage detector measures the voltage values of each row of batteries and sends the measured voltage values to a battery management system (BMS). Temperature detectors (such as thermocouples) measure temperature values at a plurality of locations in the battery system and send the measured temperature values to the BMS. The BMS receives temperature values from the temperature detector and voltage values from the voltage detector, and shut down or ramp down the battery system when a received value is higher than a threshold.

A transient voltage suppressor is included in the battery assembly to react to sudden or momentary overvoltage conditions and functions as a low pass filter to filter voltage spikes and protect the battery assembly from being damaged by overstress.

Figure 10A:
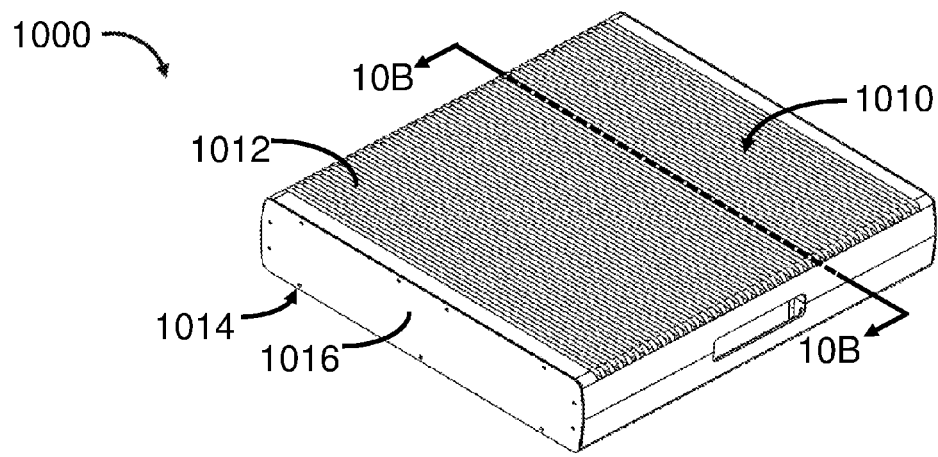
FIG. 10A shows a battery assembly in accordance with an example embodiment.

FIG. 10A shows a battery pack or battery assembly 1000 enclosed in a housing 1010 with a rectangular shape. The housing 1010 includes a top cover or lid 1012, a bottom cover or base 1014, and a plurality of side covers 1016 that house, enclose, and/or protect components of the battery assembly. The housing provides the battery assembly with a form factor such that two or more assemblies can be stacked, electrically connected, and transported together.

Figure 10B:
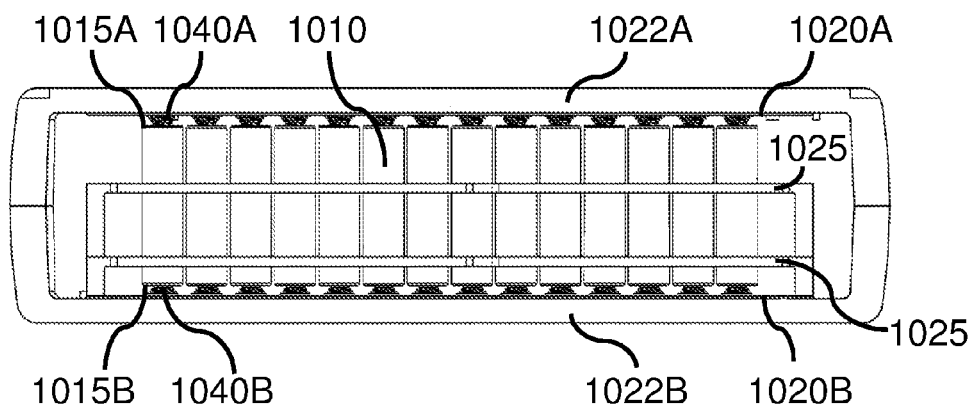
FIG. 10B shows a cut-away view of the battery assembly of FIG. 10A in accordance with an example embodiment.

FIG. 10B shows the battery assembly 1000 with the side covers removed. The battery assembly 1000 includes a plurality of batteries 1010 positioned or sandwiched between a top cover or lid 1022A and a bottom cover or base 1022B. Each battery has a first end or terminal 1015A and a second end or terminal 1015B. The first end 1015A electrically contacts or abuts a top or first printed circuit board (PCB) 1020A via a top or first spring or elastic tab 1040A, and the second end 1015B electrically contacts or abuts a bottom or second PCB 1020B via a bottom or second spring or elastic tab 1040B. The first PCB 1020A is sandwiched between the top cover 1022A and the first terminals of the batteries. The second PCB 1020B is sandwiched between the bottom cover 1022B and the second terminals of the batteries.

The battery assembly also includes a support structure 1025 that supports and aligns the batteries 1010 in the battery assembly. The support structure comprises a lattice of holes that are spaced apart such that each hole encircles a section of the battery. The support structure maintains the batteries in stable vertical orientation with respect to each other (the support structure more fully shown in FIG. 13).

As shown in FIG. 10B and with reference to FIG. 10A, the batteries are stacked, positioned, or arranged in a side-by-side relationship and arranged in a matrix-shape or grid-structure such that each of the batteries is in electrical contact with the first spring at the first terminal and with the second spring at the second terminal. In this configuration, the batteries can be connected in series, parallel, or a combination of both.

In one example embodiment, the first and second springs are filled with a dispensable thermal-interface material that functions to transfer heat from the batteries to the first and second PCBs. These thermal-interface materials remain electrically isolated from electrical conduction pathways while current flows through the springs. The thermal-interface materials cool the batteries as heat is dissipated away from the batteries to PCBs and/or another heat sink. Examples of thermal-interface materials include, but are not limited to, THERM-A-GAP™ GEL 8010 or GEL 30 manufactured by Parker Chomerics and TG4040 PUTTY manufactured by T-Global Technology.

Figure 10C:
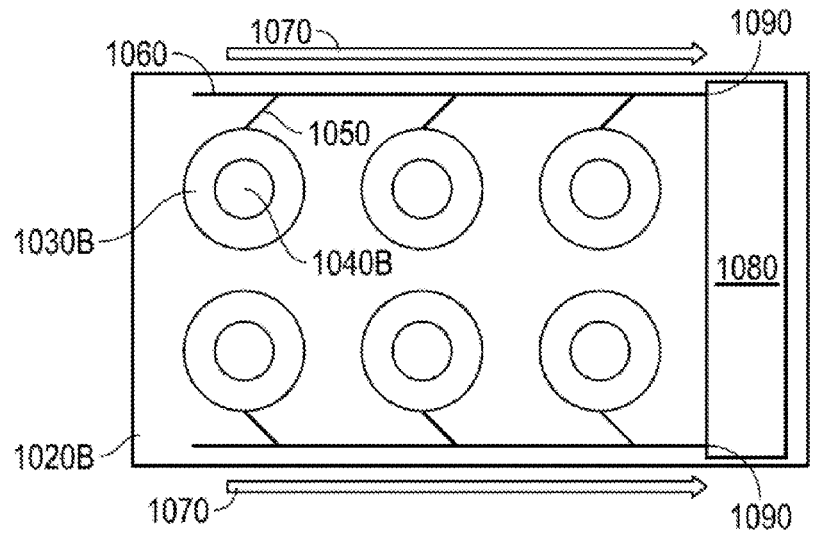
FIG. 10C shows a top view of a printed circuit board of a battery assembly in accordance with an example embodiment.

FIG. 10C shows a top view of the bottom PCB 1020B of the battery assembly 1000 in accordance with an example embodiment. A plurality of conductive shapes or regions 1030B arranged in a matrix-shape with rows and columns are integrated on a surface of the bottom PCB. The conductive shapes in the same row are connected to a bus line 1060 via compensation resistors or traces 1050. A plurality of springs or elastic tabs 1040B are mounted to and in contact with the conductive shapes on the PCB. The second end 1015B of the battery 1010 contacts the spring 1040B such that current flows from the battery to the conductive shape 1030B via the spring 1040B and further moves along the compensation resistors 1050 and the bus line 1060 in a direction pointed by arrow 1070, and collected by a power collector 1080 that is connected with the bus lines via connection points 1090.

In one example embodiment, the compensation traces function as resistive traces or resistors to compensate for different path resistances from each battery to the power collector. The sizes of the compensation traces vary based on a distance between the conductive shape 1030B and the connection point 1090 at the end of the bus line. The widths of the compensation traces are arranged in a descending order along the current flow direction. For instance, the closer to the connection point 1090, the narrower the width of the compensation trace is. By varying the widths of the compensation traces, the resistances of the traces vary to compensate for different path resistances along the bus line from the end of each trace to the power collector, and hence the variation of the current from each of the batteries to the connection point is minimized.

In addition to or instead of varying the width of the compensation traces, a thickness or height of the traces can also be varied. Alternatively, the resistance of the traces can be varied by changing the composition of the conductive material, such as doping the conductive material to change its resistance at different locations. As yet another example, a shape of the traces can change in order to vary the resistance.

Figure 11:
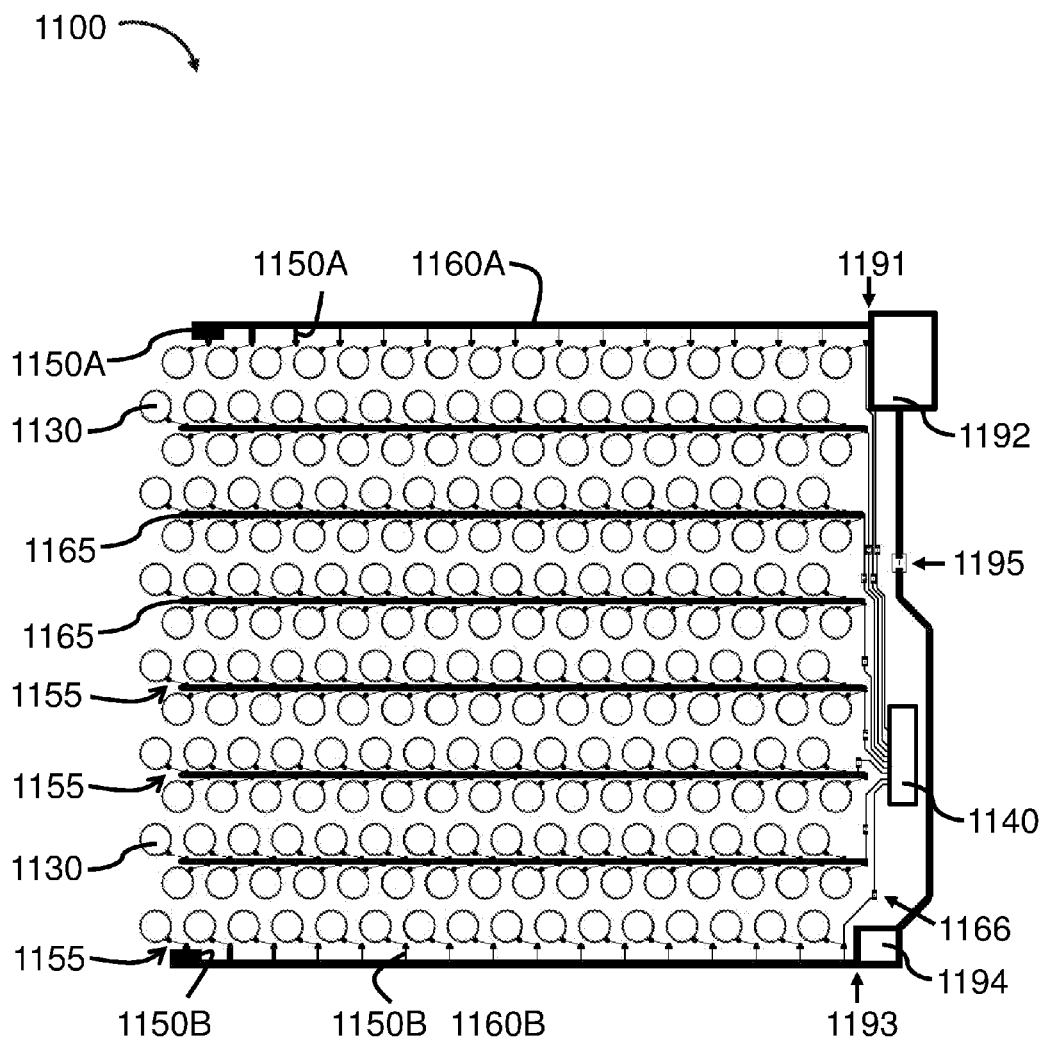
FIG. 11 shows a layout of a printed circuit board of a battery assembly in accordance with an example embodiment.

FIG. 11 shows a layout of a printed circuit board 1100 of a battery assembly in accordance with an example embodiment. A plurality of conductive shapes or regions 1130 arranged in a matrix-shape with rows and columns are integrated on a surface of the PCB. Each of the conductive shapes is connected with a fuse 1155 and a terminal of a battery such that the batteries are individually fused via the PCB. By way of example, each of the conductive shapes in the top row is electrically connected to the positive terminal of a battery cell, and is also connected to a top or positive bus line 1160A via compensation traces or resistors 1150A. The conductive shapes in the bottom row are connected to negative terminals of the battery cells and to a bottom or negative bus line 1160B via compensation traces or resistors 1150B. Fuses 1155 in the top row and bottom row are connected to the compensation traces 1150A or 1150B on one end, and connected to the corresponding conductive shape on another end. Apart from the top row and the bottom row, every two rows of the inner rows of the conductive shapes share a conductive line 1165 sandwiched between the two rows. The conductive shapes in the two neighbor rows connect to the conductive line individually via their fuses 1155. When the current from a battery exceeds the current carrying capacity of its fuse, for example 15 ampere, the fuse for that battery will break or blow and electrically disconnect or isolate the batteries from the battery assembly. The batteries in the same rows are electrically connected with each other in parallel and each row is connected with the neighbor row in series.

In one example embodiment, voltages of each row of batteries that are connected to each other in parallel are measured by a voltage detector 1140. A plurality of row fuses 1166 are connected to each of the conductive lines 1165 and the voltage detector 1140. The row fuses function as fuses for the voltage detector. When the current from a row of batteries exceeds the current carrying capacity of the row fuses, for example 1 ampere, the row fuse for that row will break or blow and electrically disconnect or isolate the batteries in that row from the voltage detector.

By way of example, batteries are electrically connected with the conductive shapes such that current flows from the battery to the conductive shapes and further into the PCB 1100, and is collected by the positive collector 1192 and the negative collector 1194. Current from the positive terminals of the batteries merges at the top bus line 1160A and moves toward the positive collector 1192. A positive connection point 1191 is at the intersection of the positive bus line 1160A and the positive collector 1192. Current from the negative terminals of the batteries merges at the negative bus line 1160B and moves toward the negative collector 1194. A negative connection point 1193 is at the intersection of the negative bus line 1160B and the negative collector 1194.

In one example embodiment, the compensation traces function as compensation resistors to compensate for different path resistances from each battery to the connection point. The sizes and/or shapes of the compensation traces 1150A or 1150B vary based on a distance between the conductive shape and the connection point 1191 or 1193. The widths of the traces are arranged in a descending order along the current flow direction. For example, the closer to the connection point, the narrower the width of the trace is. By varying the widths of the compensation traces, the resistance of the compensation traces varies to compensate for the different path resistances along the bus line from the end of each trace that joins the bus line to the positive or negative collector, and hence the variation of current from each of the batteries to the corresponding connection point is minimized. In one example, the variation of the current is less than 12%.

A transient voltage suppressor is connected with the positive collector 1192 and the negative collector 1194. The transient voltage suppressor reacts to sudden or momentary overvoltage conditions and functions as a low pass filter to filter voltage spikes with peak voltage values higher than a threshold value.

Figure 12:
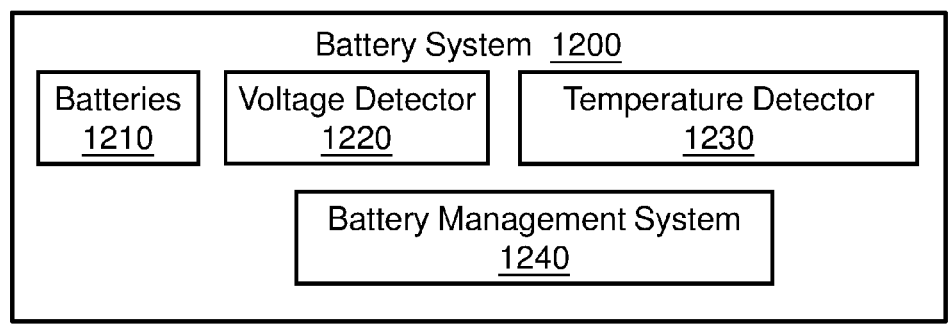
FIG. 12 shows a battery system in accordance with an example embodiment.

FIG. 12 shows a battery system 1200 in accordance with an example embodiment. The battery system 1200 includes batteries 1210, a voltage detector 1220, a temperature detector or thermal coupler 1230 and a battery management system (BMS) 1240. The BMS 1240 communicates with the voltage detector and the temperature detector. The voltage detector measures the voltage values of each row of batteries and sends the measured voltage values to the BMS. The temperature detectors measure temperature values at a plurality of locations in the battery system and send the measured temperature values to the BMS. The BMS receives temperature values from the temperature detector and voltage values from the voltage detector, and shut down or ramp down the battery system when a received value is higher than a predetermined threshold.

The battery system supplies power to loads or electrical devices. The BMS of the battery system monitors the state of each battery and protects each of the batteries from operating outside the safe operating area such as over current, over voltage, or over temperature.

Figure 13:
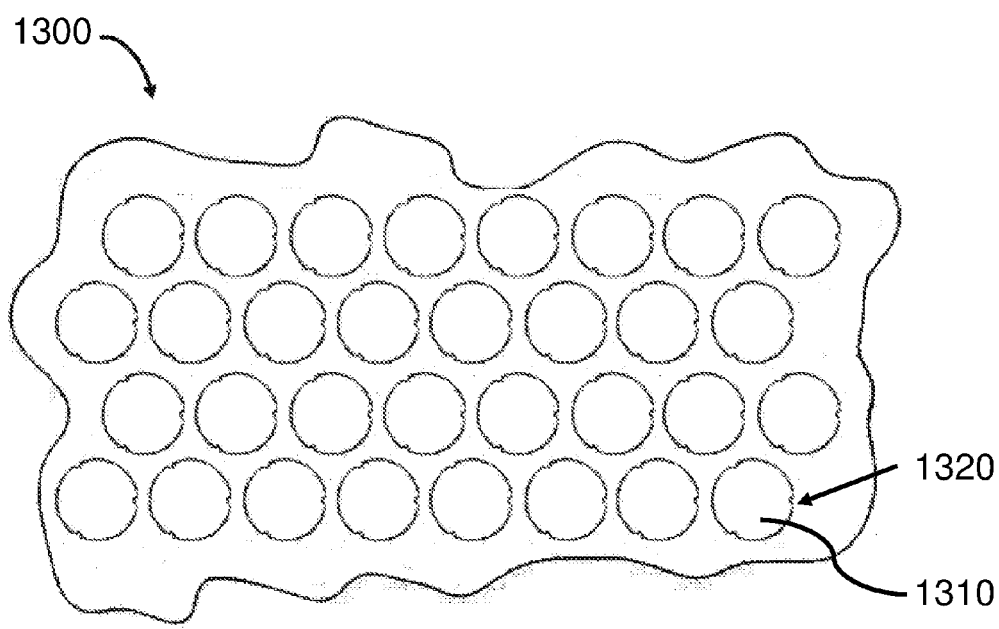
FIG. 13 shows a support structure of a battery assembly in accordance with an example embodiment.

FIG. 13 shows a support structure 1300 of a battery assembly in accordance with an example embodiment. The support structure 1300 includes a plurality of spaced holes or apertures 1310 arranged in a grid, lattice, or matrix shape. The holes are sized and shaped to receive the batteries of the battery assembly. For example, a diameter of a hole corresponds with or is slightly larger than a diameter of a battery that fits into or through the hole. The holes are spaced apart such that each hole encircles a section of a battery such that the support structure maintains the batteries in stable vertical orientation with respect to each other (for example, see FIG. 10A showing the batteries arranged in a vertical orientation).

In one example embodiment, each of the holes include at least three nubs 1320 that extend inwardly toward a radial center of the hole such that each of the batteries fits through the hole and in contact with the nubs. Comparing with relying on the perimeter of the hole to fit batteries into the holes of the support structure, utilizing the nubs to grip each battery requires a lower insert force without damaging the external protective plastic wrap of the batteries.

Figure 14:
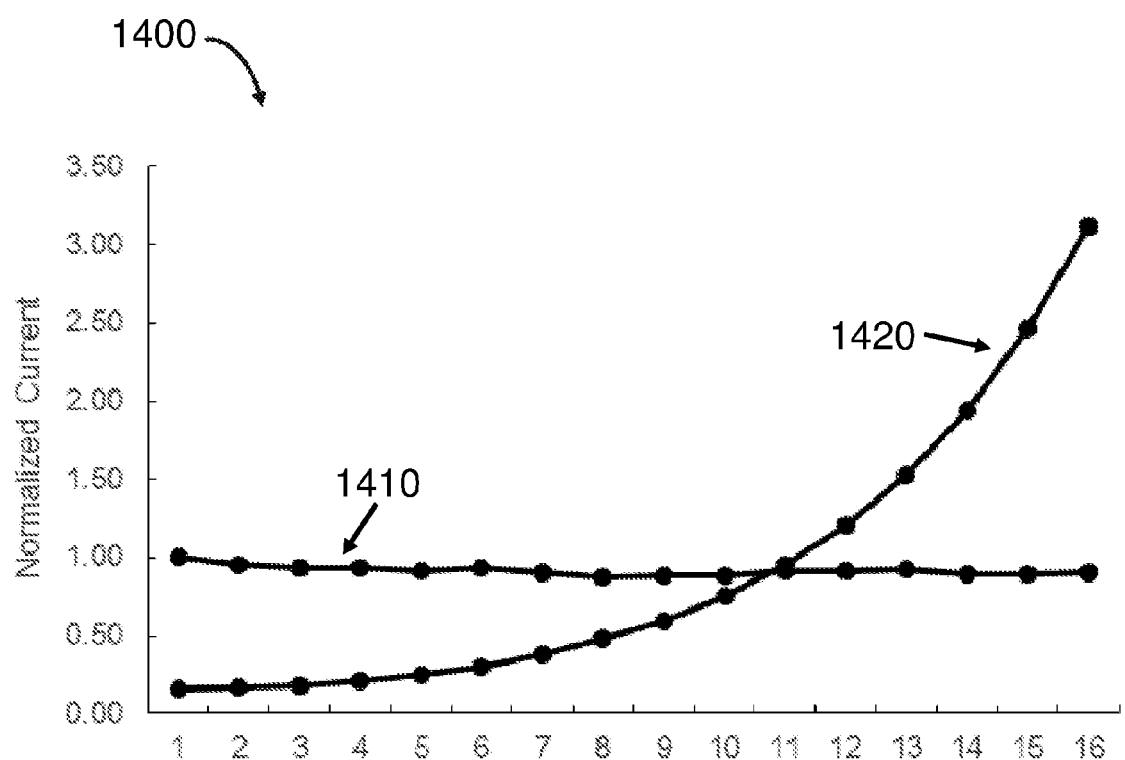
FIG. 14 shows a graph of current distribution from batteries to a connection point in accordance with an example embodiment.

FIG. 14 shows a graph 1400 of current distribution from batteries to a connection point in accordance with an example embodiment. The X-axis shows the sequential numbers of the batteries connected with the conductive shapes in the bottom row starting from the conductive shape that is farthest to the connection point 1193 as shown in FIG. 11. As discussed herein, an end of each battery is electrically connected with one of the conductive shapes. The Y-axis shows the normalized current values in arbitrary units drawn from each of the batteries in the bottom row. The dots on line 1420 are the normalized current values without incorporating compensation traces. As the $16^{th}$ conductive shape is closest to the connection point, the path resistance is the lowest, causing the current drawn from the $16^{th}$ battery to be the highest. Variation in path resistance causes a non-uniform current distribution from each battery, which leads to issues on reliability and service life. To overcome this problem, the fuses in one example embodiment are designed to have different resistances to compensate for the differences in the path resistance. In another embodiment, the fuses are of the same resistance but are connected to compensation traces with difference resistances, as shown in FIG. 11. The compensation trace closest to the connection point is of the highest resistance with the narrowest width.

The compensation trace farthest to the connection point is of the lowest resistance with the widest width. In one example, the size of the trace for the 16$^{th}$ conductive shape is 42 mm long and 0.3 mm wide, and the size of the trace for the first conductive shape is 5 mm long and 15 mm wide. The dots on line 1410 are normalized current values when the traces are precisely designed with different sizes and different resistances. In one example, the current value variation for currents flowing through the compensation traces is less than 12%.

As used herein, a "battery assembly" is an assembly of two or more batteries or batteries cells that are configured in series, parallel, or a mixture of both to deliver a desired voltage, capacity, or power density.

As used herein, a "conductor" is an object or type of material that allows the flow of electricity. Examples of a conductive material include, but are not limited to, copper, silver, gold, aluminum, zinc, nickel, brass, and other conductive material (such as other metals, graphite, polymers, and semiconductors).

As used herein, a "fuse" is a low resistant resistor that melts, breaks, or "blows" when a current exceeds a safe level. Fuses provide overcurrent protection to a load, circuit, and/or electrical component.

As used herein, "integrally formed" means formed with material common to the rest of the unit and the connection having no mechanical joints. Integrally is distinguished from two-piece or multi-piece construction in which separate pieces are connected together.

As used herein, a "printed circuit board" or "PCB" is a structure that mechanically and electrically connects electronic components using conductive tracks, pads, or pathways. PCBs can be single sided, double sided, and multi-layered.

As used herein, a "rechargeable battery" is a battery that can be charged, discharged into a load, and recharged more than once. Rechargeable batteries can be produced with different sizes and shapes and different combinations of electrode materials and electrolyte including, but not limited to, lithium ion, lithium ion polymer, nickel metal hydride, lead-acid, and nickel cadmium.

As used herein, a "matrix-shape" is a shape with rows and columns, with the numbers of rows and columns being integers greater than or equal to 1.

As used herein, a "path resistance" is the resistance of a path from the beginning of the path to the end of the path.

As used herein, a "compensation trace" is a resistor with a predetermined resistance value.

What is claimed is:

1. A battery assembly, comprising:
   a first printed circuit board (PCB) having a plurality of first conductive shapes arranged in a matrix-shape;
   a second PCB oppositely disposed from the first PCB and having a plurality of second conductive shapes arranged in a matrix-shape;
   a plurality of first springs disposed on the first conductive shapes of the first PCB;
   a plurality of second springs disposed on the second conductive shapes of the second PCB;
   a plurality of batteries stacked between the first and second PCBs in a side-by-side relationship each having a first end in electrical contact with one of the first springs on the first PCB and a second end in electrical contact with one of the second springs on the second PCB;
   a plurality of fuses integrally formed in the second PCB, each of the fuses electrically connected with one of the second conductive shapes; and
   a plurality of compensation traces each connected with one of the fuses and a bus line where a current flow along, wherein sizes of the compensation traces vary based on a distance between the second conductive shapes and a connection point on the bus line to compensate for resistance differences from each battery to the connection point,
   wherein the compensation trace located at a first distance from the connection point has a higher resistance compared with the compensation trace located at a second distance from the connection point that is longer than the first distance.

2. The battery assembly of claim 1, wherein the springs are arranged in the matrix-shape with an N×M configuration, with N and M being integers greater than or equal to 1.

3. The battery assembly of claim 1, wherein the first and second springs are filled with a thermal-interface material that functions to transfer heat from the batteries to the first and second PCBs.

4. The battery assembly of claim 1, wherein widths of the compensation traces are arranged in a descending order along the current flow direction.

5. The battery assembly of claim 1 further comprising a support structure with a plurality of holes arranged in the matrix-shape and positioned between the first and second ends of the batteries such that each of the batteries fits through one of the holes and aligns with one of the springs in the first and second PCBs.

6. The battery assembly of claim 1 further comprising a support structure with a plurality of apertures each including at least three nubs that extend inwardly toward a radial center of the apertures such that each of the batteries fits through one of the apertures and in contact with the nubs.

7. The battery assembly of claim 1, wherein the batteries are individually fused via the fuses integrated in the second PCB.

8. The battery assembly of claim 1, wherein the batteries in a row are electrically connected to each other in parallel and an average voltage of the row of batteries is detected by a voltage detector and sent to a battery management system.

9. A battery assembly, comprising:
   a first printed circuit board (PCB) in electrical contact with a plurality of first springs arranged in a matrix-shape;
   a second PCB integrated with a plurality of fuses each electrically connected with one of second springs that are disposed on the second PCB;
   a plurality of batteries electrically connected to each other and located between the first PCB and the second PCB with each of the batteries including a first terminal in electrical contact with one of the first springs on the first PCB and a second terminal in electrical contact with one of the second springs on the second PCB; and
   a plurality of resistors having a first end connected with one of the fuses and a second end connected with a bus line,
   wherein the resistor located at a first distance from a connection point on the bus line has a higher resistance compared with the resistor located at a second distance from the connection point that is longer than the first distance.

10. The battery assembly of claim 9 further comprising a plurality of thermocouples that measure temperature values at a plurality of locations between the first PCB and the second PCB and send the measured temperature values to a battery management system.

11. The battery assembly of claim 9 further comprising a battery management system (BMS) that receives a temperature value from thermocouples and shut down the battery assembly when a received value is higher than a predetermined threshold.

12. The battery assembly of claim 9 further comprising a transient voltage suppressor that filters voltage spikes with peak voltage values higher than a threshold value.

13. The battery assembly of claim 9 further comprising two support structures each with a lattice of holes that are spaced apart such that each hole encircles a section of a battery and the support structures maintain the batteries in stable vertical orientation with respect to each other.

14. A battery assembly that houses a plurality of rechargeable batteries, comprising:
 a first aluminum printed circuit board (PCB) having a plurality of first conductive regions arranged in a grid of rows and columns;
 a second aluminum PCB oppositely disposed from the first aluminum PCB and having a plurality of second conductive regions arranged in a grid of rows and columns
 a plurality of first elastic tabs disposed on the first conductive regions of the first aluminum PCB to electrically connect a first end of the rechargeable batteries with one of the first conductive regions of the first aluminum PCB;
 a plurality of second elastic tabs disposed on the second conductive regions of the second aluminum PCB to electrically connect a second end of the rechargeable batteries with one of the second conductive regions of the second aluminum PCB;
 a plurality of fuses integrally formed in the second aluminum PCB, each of the fuses electrically connected with one of the second conductive regions; and
 a plurality of compensation traces each connected with one the fuses,
 wherein resistances of the compensation traces vary based on a distance to a connection point such that a current value variation for currents flowing through the compensation traces is less than 12%.

15. The battery assembly of claim 14, wherein the compensation traces located at a first distance from the connection point have a higher resistance compared with the compensation traces located at a second distance from the connection point that is longer than the first distance.

16. The battery assembly of claim 14 further comprising a battery management system (BMS) that receives a voltage value of each of the rechargeable batteries, and shut down the battery assembly when a received value is higher than a predetermined threshold.

17. The battery assembly of claim 14, wherein each of the rechargeable batteries has a separate fuse and is removable from and replaceable into the battery assembly without removing the rechargeable batteries in the battery assembly.

18. The battery assembly of claim 14 further comprising a support structure with a plurality of holes arranged in a grid of rows and columns that match the grid of rows and columns of the first and second conductive regions such that the holes of the support structure receive the rechargeable batteries and align the rechargeable batteries with the first and second elastic tabs disposed on the first and second conductive regions.

19. The battery assembly of claim 18, wherein each of the holes including nubs that extend inwardly toward a radial center of the holes such that each of the rechargeable batteries fits through one of the holes and in contact with the nubs.

* * * * *